(12) United States Patent
Ciet et al.

(10) Patent No.: US 8,165,286 B2
(45) Date of Patent: Apr. 24, 2012

(54) COMBINATION WHITE BOX/BLACK BOX CRYPTOGRAPHIC PROCESSES AND APPARATUS

(75) Inventors: Mathieu Ciet, Paris (FR); Augustin J. Farrugia, Cupertino, CA (US); Jean-Francois Riendeau, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1051 days.

(21) Appl. No.: 12/061,363

(22) Filed: Apr. 2, 2008

(65) Prior Publication Data

US 2009/0252327 A1 Oct. 8, 2009

(51) Int. Cl.
*H04K 1/00* (2006.01)
*H04L 9/00* (2006.01)
*H04L 9/28* (2006.01)
*H04L 29/06* (2006.01)
*G06F 17/00* (2006.01)

(52) U.S. Cl. .................. 380/28; 726/1; 726/15
(58) Field of Classification Search .................. None
See application file for complete search history.

(56) References Cited

U.S. PATENT DOCUMENTS

| | | | |
|---|---|---|---|
| 7,047,405 B2 * | 5/2006 | Mauro ............... | 713/166 |
| 7,194,634 B2 * | 3/2007 | Ellison et al. ........ | 713/190 |
| 7,500,112 B1 * | 3/2009 | Wille et al. .......... | 713/194 |
| 2002/0184046 A1 * | 12/2002 | Kamada et al. ....... | 705/1 |
| 2003/0152218 A1 * | 8/2003 | Coron et al. ......... | 380/30 |
| 2003/0194086 A1 * | 10/2003 | Lambert .............. | 380/44 |
| 2007/0140479 A1 * | 6/2007 | Wang et al. .......... | 380/30 |
| 2007/0198851 A1 * | 8/2007 | Goto .................. | 713/187 |
| 2009/0135180 A1 * | 5/2009 | Li ..................... | 345/420 |
| 2009/0168999 A1 * | 7/2009 | Boswell et al. ...... | 380/44 |

OTHER PUBLICATIONS

Bringer, J. et al. (2006). "White Box Cryptography: Another Attempt," located at <http://eprint.iacr.org/2006/468.pdf>, last visited on Jul. 22, 2011, 14 pages.
Chevallier-Mames, B. et al. (2005). "Secure Delegation of Elliptic-Curve Pairing," located at <http://eprint.iacr.org/2005/150.pdf>, last visited on Jul. 22, 2011, 11 pages.
Chow, S. et al. (2003). "A White-Box DES Implementation for DRM Applications," *Lecture Notes in Computer Science* 2696:1-16.

(Continued)

*Primary Examiner* — Nathan Flynn
*Assistant Examiner* — Trang Doan
(74) *Attorney, Agent, or Firm* — Morrison & Foerster LLP

(57) ABSTRACT

Method and apparatus for increasing security of a cryptographic algorithm such as deciphering, enciphering, or a digital signature. A cryptographic algorithm and a key are provided such that a deciphering process, for instance, is partitioned between two portions. The portion of the cryptographic algorithm carried out in the first portion is implemented in a "white box" model such that it is highly secure even against an attack by the user who has full access to internal operations, code execution and memory of the user device, such as a hacker or attacker. The remaining portion of the algorithm is carried out in the second portion. Since this second portion has relaxed security constraints, its code may be implemented using a "black box" approach where its code execution may be more efficient and faster, not requiring the code obfuscation of the white box implementation in the user device. This partitioning may be achieved using a delegation protocol. The chief advantage is that even given a limited code size for the cryptographic process, the security of the system is improved by carrying out the more computationally intensive functions more efficiently in the black box portion and executing the less computationally intensive function in the white box portion.

24 Claims, 1 Drawing Sheet

OTHER PUBLICATIONS

Sullivan, N. (Jun. 26, 2007). "DRM and White-Box Cryptography," located at <http://www.symantec.com/connect/blogs/drm-and-white-box-cryptography>, updated on Jun. 29, 2009, last visited on Jul. 22, 2011, 2 pages.

* cited by examiner

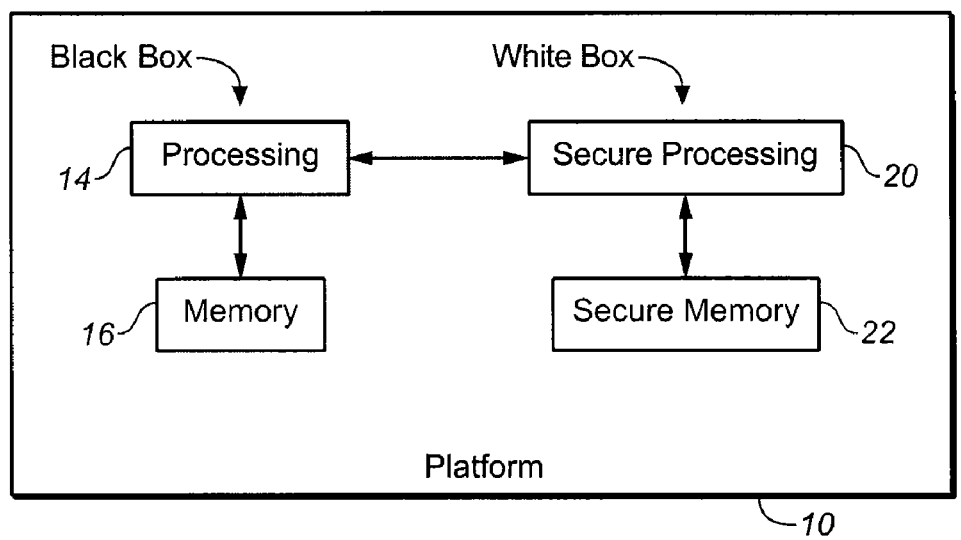

COMBINATION WHITE BOX/BLACK BOX CRYPTOGRAPHIC PROCESSES AND APPARATUS

FIELD OF THE INVENTION

This invention relates to data security and cryptography and more generally to improving the security of computer enabled cryptographic processes and algorithms.

BACKGROUND

Cryptography is a well-known field. It generally involves transformations of data into another form using a cryptographic algorithm and an encryption key. The recipient of a message including the encrypted data must decrypt the encrypted message, using the same key or a different key in the case of private key/public key cryptography, in order to access the data. Cryptography is widely used in the field of digital rights management (DRM) which refers to various content protection schemes used by digital content (such as audio and video material) providers to restrict usage of digital media and devices to authorized persons. A popular DRM scheme is the Apple FairPlay system, used by the Apple on-line iTunes store. Another is Microsoft's Windows Media DRM. These systems use strong cryptography to protect media such as digital files from being viewed except by hardware or software that have the proper credentials.

For most DRM and other cryptographic applications, a trusted media player (a computer program) contains or is supplied with a decryption key used to decrypt and play the protected media content. This decryption key must be secret and preferably inaccessible to the user. In the context of DRM, the user is typically one of many consumers and is not a "trusted individual" in cryptography terms. The reason for this is that finding this decryption key would allow someone, such as a user lacking integrity, to decrypt the data without restriction, defeating the DRM protection. This poses a major problem because a "trusted" media player, such as the Apple iPod client software, often runs on an untrusted (insecure) platform, which is the consumer's Apple iPod device (player) for instance. This device also may be the user's home computer which is also an untrusted device in the sense that it is solely under control of the untrusted user. Thus keeping decryption keys used by the trusted media player software from being accessible to the user is a major challenge faced by DRM.

Many DRM schemes have failed to operate properly by neglecting to keep their key safe.

The threat models used in traditional computer enabled cryptography are referred to as "black box attack models". In this type of attack, the attacker is assumed to have control over the decryption; however, the actual key and the details of the decryption code (software) execution are unknown. Thus a device (platform) on which the cryptographic software is running is not internally accessible to the attacker. Thus in the conventional black box attack model, the attacker has at most access to the input and output of the cryptographic program. In contrast, in the DRM situation the more challenging environment is referred to as the "white box attack model". This attack model is the strongest conceivable one in terms of the advantages to the attacker because the attacker is assumed to have full access to the decryption software and full control over its execution environment (the platform), including being able to access processor memory during execution of the decryption algorithm. In the white box attack model, the attacker has control of the execution environment. This includes arbitrary trace execution, examining sub-results and access to keys located in memory as well as the ability to perform arbitrary static analysis on the software and altering results of sub-computations for perturbation analysis. Hence the goal of white box cryptography is to make key extraction difficult even in the presence of such access by the attacker. The typical media player device and its software are under control of the user, who is also the attacker here. That is, the black box attack model assumes in a communication that the endpoints are both trusted entities. In contrast in the white box attack, the attack comes from the inside where the attacker is typically the user of the software or a virus installed by him on the device running the software.

Hence white box cryptography is well-known and aims at solving the problem of how to implement a cryptographic algorithm in computer software such that the decryption key cannot be extracted by a white box attack (e.g., white box cryptography provides a secured computation). This is typically done using software protection methods such as code obfuscation and tamper resistance. Code obfuscation protects the cryptographic software program against reverse engineering by transforming the program into a functionally and semantically equivalent one that is harder for an attacker to understand. In terms of tamper resistance, the goal is to protect against an attacker who tries to make a modification to a software program, such that the program has a particular different functionality, for instance a routine for implementing access and permission control. The problem of white box cryptography is relevant for a content provider implementing a DRM scheme who broadcasts or downloads encrypted copyrighted or proprietary content and wishes to prevent an authorized user from extracting and (illegally) putting the decryption key for instance in a public place, such as posted on the Internet. An implementation of a cryptographic algorithm that tries to resist a white box attack on its key is called a "white box implementation". One way to do this for instance is with modifications to well-known block ciphers such as AES and DES which hides (obfuscates) the key of the implemented block cipher in a large collection of lookup tables. As a result, a typical white box implementation can be viewed as standalone cryptographic algorithm, the key of which is given only by the collection of lookup tables.

A typical application is a DRM client device implementing software that has to validate conditions in a DRM license before it decrypts the corresponding content. The content for instance may be encrypted by AES, which is a well-known cipher, since this block cipher is as indicated above known to have a white box implementation. One version of this white box block cipher implementation adds arbitrary lookup tables without changing the cryptographic function that it implements. Hence the decryption algorithm is implemented by a white box implementation consisting of a collection of lookup tables (the white box key) and a decryption routine that uses the white box key to decrypt the content. Note that this description of a white box implementation of AES and DES encryption is merely illustrative. In this context, DES and AES are symmetric key ciphers. It is possible also to have a white box implementation of an asymmetric (public key) cipher, such as the RSA public key-type ciphers.

None of these white box cryptography techniques have been proven to be secure; however, in a practical sense they certainly enhance the security of DRM schemes. White box cryptography, while not proven to be secure, does offer useful levels of security in the form of additional protection, especially suitable in the commercial world of distribution of content such as digital and audio files. (This may not be adequate security for high-level security information such as government communications and financial transactions.)

As understood from the above, white box solutions are inherently significantly bulkier (requiring more code and hence more storage) and thus slower to execute on a conventional processor than black box cryptography algorithms. These drawbacks may be offset by advantages justifying the white box solutions in some applications, such as the DRM situation. Software-only white box "key hiding" components may be cost effectively installed and updated periodically. White box implementations are already successfully used commercially, as outlined above.

The chief drawback of any current white box solution is the bulkiness (length) of the associated software code and the resulting extended computational time required due to the complexity of the white box solutions which is inherent in their obfuscation approach. This has been found to be a barrier to use of white box cryptography. The present inventors have identified that one way to make white box cryptography more attractive and useful is to reduce overall code length and computational time of the cryptographic process.

SUMMARY

In accordance with the invention, a combined white box/black box approach is used for a particular cryptographic process. The cryptographic algorithm, e.g. decryption, is partitioned into two or more parts. While one part is performed in the white box environment, a second part is carried out more efficiently in a black box programming environment. The two environments may be both resident on one platform (computing or other electronic device) or be resident on two connected platforms. That is, the cryptographic algorithm is partitioned between two entities (which may be merely different computer programs or parts of a program on one platform, but also may be executed on different platforms) where the less computationally intensive part, which is the white box part which takes place in the insecure environment, is only a part of the algorithm and the more computationally intensive remaining part is carried in the black box environment where security constraints are relaxed. In one version, the cryptographic algorithm is partitioned into three parts with the initial part being carried out in the white box environment, the second part in the black box environment, and the third part in the white box environment. The concatenation of all three parts results in the entire cryptographic algorithm taking place. Typically the white box portion of the computation is less computationally intensive here. When the various parts are combined together if security has been breached in the black box environment this may be readily detected in the white box environment and the cryptographic algorithm (e.g., a digital signature verification) may fail due to the detected penetration.

The cryptographic algorithm here may be conventional enciphering or deciphering. It also may be a conventional cryptographic verification process, such as an identity or integrity verification function or a digital signature process. Hence the entire cryptographic algorithm is partitioned or decomposed into parts. This decomposition or partitioning may be based on a delegation protocol. As well known, delegation protocols are based on homomorphical encryption schemes known in the field.

In one application the white box and black portions are executed on the same platform (e.g., computing device) and possibly on the same processor. Only one white box portion is implemented and this is used to compute other algorithms, to reduce code (software) size. This approach is also suitable where security constraints are less stringent situation where a user device or apparatus, such as a media player, is an untrusted device (platform) and hence the white box portions of the cryptographic algorithm are executed by it and the more computationally intensive portions may be carried out in the black box environment of a second device, such as a central server not under control of or accessible by users.

BRIEF DESCRIPTION OF THE DRAWINGS

FIG. 1 shows an environment in which the present method may be used.

DETAILED DESCRIPTION

FIG. 1 shows in a high-level block diagram an exemplary single device environment which is a computing device (platform) 10 in which the present method and apparatus may be used. The left-hand side shown as here designated a "black box" since the security constraints are of less concern. It includes, as is conventional, a processing element 14 and a memory 16. Here the processing element and memory are indicated as being "secure" in the sense that they are not internally accessible to users or to the public, by design of the system. The right hand portion is untrusted, hence designated "white box" having processing element 20 and memory 22, both secure. Since this is a white box environment, there is an obfuscator element (not shown) which implements a known white box cryptographic function. Note that processing elements 14, 20 may be in software, which in fact is executed on the same processor (hardware).

The present method thereby partitions a cryptographic algorithm (process). The present method in more detail, including the partitioning aspects, is as follows.

1. The system designer establishes or selects a particular conventional cryptographic algorithm here designated S. As indicated, this may be a decryption algorithm, but may be an encryption or a verification (such as a digital signature creation or verification) function. The output of cryptographic algorithm S applied to data d with key k equals $S(d,k)$ expressed logically. Next, the system designer partitions cryptographic algorithm S into, for example, three portions. These are designated here functions $M(\ )$, $P(\ )$, and $N(\ )$, each of which is a sub-function and which together $S(d,k)=N[P[M(d,k)]]$ to express this logically. (In this notation each function as usual operates on the values within its parenthesis or brackets.) Typically each function is embodied in computer software (code) or hardware or a combination thereof or firmware. Partitioning and coding this would be routine in light of the present disclosure since the underlying cryptographic algorithm S is already well known. Hence the main design task here is the algorithm partitioning aspect. For instance the algorithm may be the above-identified AES or DES white box implementations well known in the cryptographic literature. But, note that the actual code obfuscation is done beforehand by the system designer.

2. Next the system designer partitions the algorithm so that the function $M(\ )$ is suitable to be executed in the white box environment (algorithm) shown in the right-hand portion of FIG. 1. That is, this is a white box implementation of this particular function $M(\ )$.

3. The designer further partitions the algorithm so that function $P(\ )$ is suitable to be executed in the black box environment shown in the left-hand portion of FIG. 1. Hence function $P(\ )$ is intended to be implemented in a more straight-forward, black box implementation and is relatively less bulky in terms of code and faster to execute. The designer of the system partitions algorithm S so that the portion executing in the black box environment is the more computationally intensive part and so can be done relatively more efficiently in the black box environment rather than in the computationally slower white box environment.

4. The third function N( ) is also selected to be a white box implementation similar to that of function M( ) and thus is also intended to be executed in the white box environment on the right-hand side of FIG. 1.

In one embodiment, functions N( ) and M( ) each are an identity or an integrity checking function or involve some secret, such as temporary secret or otherwise. For example, a secret is conventionally used in digital signatures, and it is a secure scalar value. Generally the secret is a random value used in a cryptographic protocol. This renders actual computation of these functions relatively fast and efficient since they need not be highly computationally intensive, so only set of one white box functions can be shared by several cryptographic processes.

5. In more detail, function M( ) is expressed logically as M(d,k)=g(d),h(k),r. That is function M( ) transforms data d and key k into values g(d) and h(k) respectively, in a way such that knowledge of g(d) and h(k) do not give any advantage to an attacker in order to retrieve the secret which is typically key k or part of key k. Note that key k may have both public and private parts. Also, knowledge of the values of g(d) and h(k) does not allow one to retrieve the data d itself.

Function M( ) also outputs value r, which may be void data, that is of no value, however r can be used to eventually test the consistency of the P( ) function computation. Value r can also be constructed using the values of d and k via a derivation function.

6. This step is not part of the system design, but takes place when the system is used, that is when the cryptographic algorithm is actually computed in, e.g., the environment of FIG. 1. One computes the value of function P( ) as P[M(d,k)]= P[g(d),h(k),r]. This computation is executed in the black box environment to the left-hand side of FIG. 1 and hence is intended to be the more computationally intensive portion of the overall cryptographic algorithm if efficiency is important. The more computation that can be carried by the P( ) function rather than by M( ) and N( ), generally the faster is overall execution.

8. To complete computation of the cryptographic algorithm S, compute function NO as N[P[M(d,k)]] as equal to N[P[g (d),h(k),r]]=S(d,k). Function N( ) is computed in the white box 2 of FIG. 1. In other words, function N( ) takes as its input the result of function P( ) and other parameters depending on d, k, r and other data useful to return the desired result. For instance, assume a secret value has been generated to delegate to this computation. To extract a digital signature from the result coming from the black box portion, one may need the inverse of this secret value. In other words, the algorithm performs an evaluation of S or checks the return result is correct with a given (high) probability. (This is only a probability, since one cannot be sure the result is correct due to an error in the black box computation.) The main advantage here of course it is possible to implement only functions M( ) and N( ) in the white box portion, which is the computationally bulkier and slower environment. Moreover, these two functions M( ) and N( ) can be common to various different cryptographic algorithms S, as explained below.

A tool to achieve such partitioning of cryptographic algorithms is based on the delegation protocol, well known in the field. In this case the M( ) function modifies the data d and key k such that after the delegated P( ) computation, it is possible to retrieve the desired value applying the N( ) function to the result. Generally delegation protocols are based on homomorphical encryption schemes.

As well known in the field, secure delegation in the cryptographic field occurs when one object (the delegator or initiator) authorizes another object (the delegate) to perform a task using (some of) the rights of the delegator. The authorization lasts until a target object (endpoint) provides the intended service. The essence of secure delegation is to be able to verify that an object that claims to be acting on another's behalf is indeed authorized to act on its behalf. This is relatively complicated considering mobile objects, agents, and downloadable content being passed around an open network such as the Internet where the initiator does not need to know where all its representative objects are being passed around. Thus typically such an approach uses various protocols including impersonation and cascaded (chain) delegation to disable and revoke delegation. Typically in one type of delegation protocol, a delegation certificate is passed to a delegate and can only be used by the object it is issued for. This is a well-known approach. When an object decides to delegate a task to another object, it creates a delegation certificate which specifies the initiator, the role it is delegating, any constraints that are bound to the delegation, a nonce, validity period and its delegation server name. The delegation certificate is generated in one version using the code executor as from principle and the code executor of a remote administrative object is the two principles. Implementations are often based on public key cryptographic using X.509 device certificates, which are also well known. Typically a delegation certificate is issued for each delegation session unless an earlier delegation has been set to remain valid for consecutive sessions. However none of this is limiting in the context of the present invention, but merely illustrative.

The following gives a simple example of the present method to show it is possible to construct such a simple partitioned public key-private key cryptographic algorithm. (This example has limited practical utility and is for purpose of illustration.) Suppose there is a given message m to digitally sign with key (d, n), where d is the secret (private) key and n is the public key modulus as is conventional in such public key-private cryptography such as RSA. The aim here of the cryptographic algorithm is to compute, e.g., an RSA signature (digital signature value) of message m. In this case the RSA signature as well-known equals $m^{d\ mod\ n}$.

Mathematically it is possible to speed up the computation of the RSA signature if the value $m^l$ is available using the well known joint form where $l=2^{(|d|2/2)}$, where notation $|.|_2$ denotes the bit size of message m. In the context of the above partitioning where a cryptographic algorithm S is partitioned into functions M( ), P( ), and N( ), the result of the M( ) function is the output message m. The P( ) function computes the value $m^l$ which is computationally intensive, while is the N( ) function computes the exponentiation using the now available $m^l$, which is relatively efficient and speedy. The N( ) function can also use the public key exponent e to check that the RSA signature is valid and in this way to check if the return value of function P( ) is correct.

As described above, functions M( ) and N( ) are implemented in the white box environment, but it is possible of course in other embodiments to implement M in a black box platform and hence have two of the three functions in the black box (or one may use other partitions). In yet other embodiments the cryptographic algorithm is only partitioned into two parts, one executed in the black box and one in the white box environment.

The following is a more complex and realistic example of the present method. The cryptographic algorithm S is to compute an RSA digital signature of message m. Assume that a known white box secure implementation of a modular exponential exponentiation method applicable to the RSA signature computation is provided. Also assume one wants to evaluate a pairing over a curve for the signature. (This relates to the process of secure delegation of elliptic-curve pairing well known in the field. For instance it is known to have a simple protocol for secure delegation of elliptic-curve pairing.) Pairing based cryptography is well known for key exchanges and digital signatures, see "Secure Delegation of Elliptic-Curve Pairing" (Benoît Chevallier-Mames et al. available on the Internet at eprint.iacr.org/2005/150/). In that paper, an RSA signature is generated carrying out five steps:

1. In the first step, two random numbers are generated and three pairings are queried.
2. In the next step, the device checks the pairings for validity.
3. In the next step, the device computes a purported value for the elliptic-curve pairing.
4. In the next step, the device generates four random values and queries the pairing.
5. The last step, the device computes a new pairing and checks validity.

In accordance with the present invention instead of the device carrying out all of these steps in a white box environment the pairing operations of steps 1 (function M( )) and 4 (function N( )) are executed in the white box environment, and the more computationally intensive operations (function P( )) of computing the purported pair and computing the validity check) are executed in the black box environment.

With the present method and apparatus it is possible to develop an implementation of a white box cryptographic function which is regarded as quite secure and to use protocols to add software tools without much increasing the overall system code size or bulkiness. Hence the amount of code executed in the slower white box implementation may be relatively limited, with the bulk of the computation and code being resident in and executed in the black box environment. Hence even with limited code size, overall system security is improved.

Any suitable computer language may be used for writing the code here such as C++. The actual code resident in each platform of FIG. 1 is typically in compiled (object) code form, as is conventional in computer systems. Additionally of course further security measures may be employed such as additional code obfuscation, etc., especially in the user device.

This description is illustrative but not limiting; further modifications will be apparent to those skilled in the art in light of this disclosure and are intended to fall within the scope of the appended claims.

The invention claimed is:

1. A computer enabled method of performing a cryptographic process involving a key, comprising the acts of:
   providing a cryptographic process partitioned into at least first, second and third portions wherein the second portion operates on a result of the first portion, and the third portion operates on a result of the second portion;
   executing the first portion in a White Box first environment whereby a key for the cryptographic process is not stored in a memory associated with the White Box first environment;
   executing the second portion in a Black Box second environment whereby a key for the cryptographic process may be stored in a memory associated with the Black Box second environment;
   executing the third portion in the White Box first environment; and
   combining results of the first and second and third portions to provide an output of the cryptographic process, wherein the third portion is an identity or integrity verification function and verifies security of the second portion.

2. The method of claim 1, wherein the first portion operates on data using the key, and provides a modified version of the key and data, and check data.

3. The method of claim 1, wherein the cryptographic process is a symmetric key cipher, an asymmetric key cipher, a signature or a verification.

4. The method of claim 1, wherein the partitioning includes invoking a delegation protocol.

5. The method of claim 4, wherein the delegation protocol includes a homomorphic encryption.

6. The method of claim 1, wherein the cryptographic process includes elliptic curve pairing, and wherein:
   the first portion generates random numbers for the elliptic curve pairing;
   the second portion computes the curve pairs from the random numbers; and
   the third portion generates additional random numbers.

7. The method of claim 6, wherein further the second portion computes new pairs from the additional random number.

8. A system for carrying out the method of claim 1, the system including the White Box first environment, the Black Box second environment, the associated memories and wherein the two environments communicate with one another over a communications channel.

9. The system of claim 8, wherein the communications channel is one of a computer network, a computer bus and a radio frequency link.

10. The method of claim 1, wherein the Black Box second environment has more processing power than does the White Box first environment.

11. A non-transitory computer readable medium storing computer code for carrying out the method of claim 1.

12. A computing device programmed to carry out the method of claim 1.

13. Apparatus for performing a portion of a cryptographic process involving a key, comprising:
   a first memory for storing information related to the key;
   a White Box first processing environment coupled to the memory;
   a port coupled to the White Box first processing environment and adapted for communicating with a Black Box second processing environment;
   wherein the White Box first processing environment executes a first and a third portion of the process, the apparatus not having the key stored in its memory, and the Black Box second processing environment carries out a second portion of the cryptographic process, wherein the second portion operates on a result of the first portion, and the third portion operates on a result of the second portion; whereby the results of the first and second and third portions are combined to provide an output of the cryptographic process; wherein the third portion is an identity or integrity verification function and verifies security of the second portion.

14. The apparatus of claim 13, wherein the first portion operates on data using the key, and provides a modified version of the key and data, and check data.

15. The apparatus of claim 13, wherein the cryptographic process is a symmetric key cipher, an asymmetric key cipher, a signature or a verification.

16. The apparatus of claim 13, wherein the partitioning includes invoking a delegation protocol.

17. The apparatus of claim 16, wherein the delegation protocol includes a homomorphic encryption.

18. The apparatus of claim 13, wherein the cryptographic process includes elliptic curve pairing, and wherein:
the first portion generates random numbers for the elliptic curve pairing;
the second portion computes the curve pairs from the random numbers; and
the third portion generates additional random numbers.

19. The apparatus of claim 18, wherein further the second portion computes new pairs from the additional random number.

20. The apparatus of claim 13, wherein the port communicates with the Black Box second processing environment over a communications channel.

21. The apparatus of claim 20, wherein the communications channel is one of a computer network, a bus and a radio frequency link.

22. The apparatus of claim 13, wherein the Black Box second processing environment has more processing power than does the White Box first processing environment.

23. The method of claim 1, wherein the White Box first and Black Box second environments use the same processor.

24. The apparatus of claim 13, wherein the White Box first and Black Box second processing environments use the same processor.

* * * * *